July 11, 1950 W. E. BARNES 2,514,355
WELL BORE CALIPER WITH HELICALLY TRAVELING FEELER
Filed Dec. 12, 1946
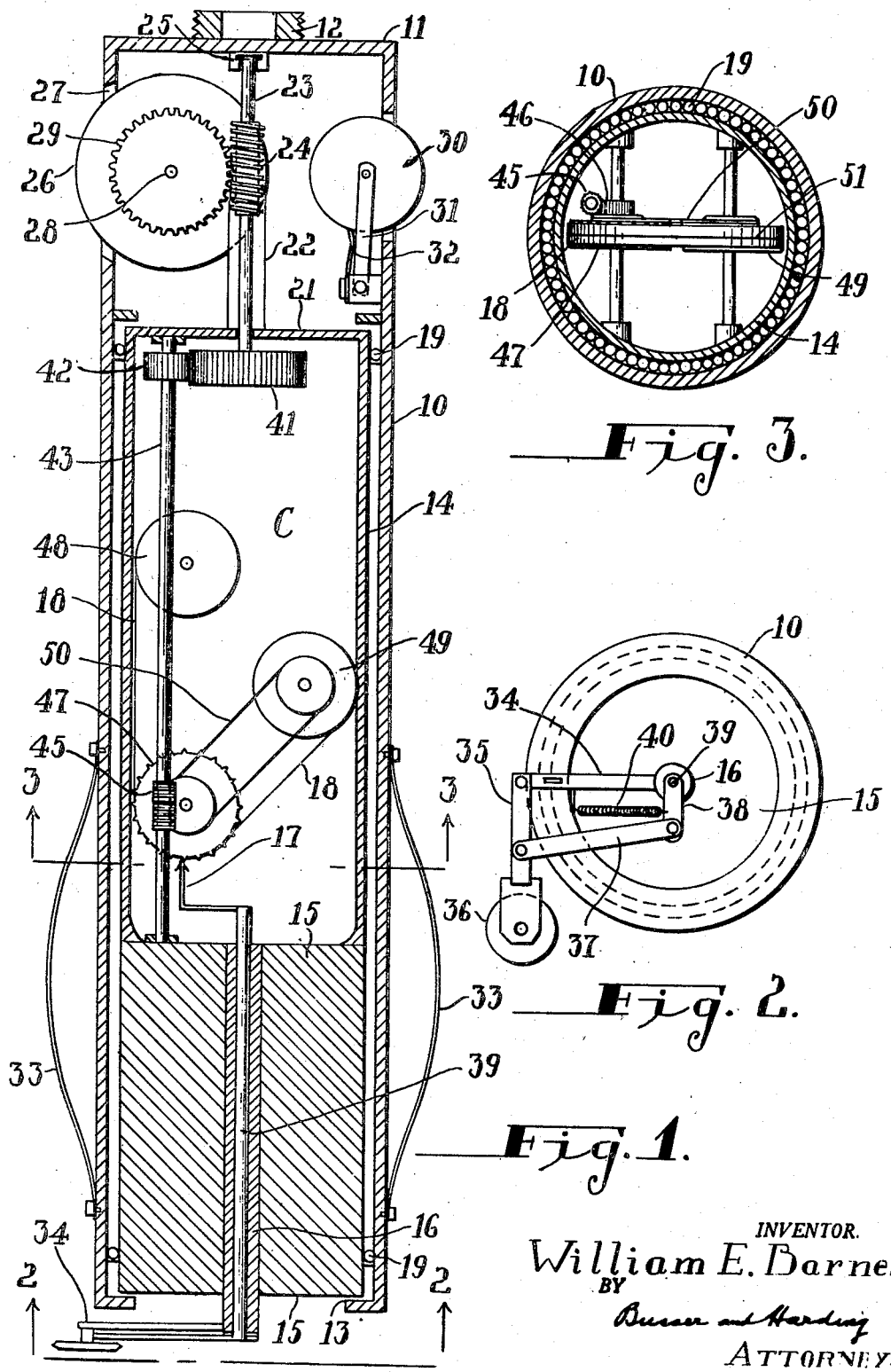
INVENTOR.
William E. Barnes
BY
Busser and Harding
ATTORNEYS Patented July 11, 1950

2,514,355

UNITED STATES PATENT OFFICE 2,514,355

WELL BORE CALIPER WITH HELICALLY TRAVELING FEELER

William E. Barnes, Beaumont, Tex., assignor to Sun Oil Company, Philadelphia, Pa., a corporation of New Jersey Application December 12, 1946, Serial No. 715,845

4 Claims. (Cl. 33—178)

This invention relates to calipering devices and more particularly to a type of measuring and recording instrument adapted to be passed through a pipe line or the like to indicate and record the internal condition of the pipe.

Pipe and tubing used in industrial operations to transport fluids of a corrosive nature and subject to pressures, either internal or external, become unsafe due to corrosion or pressure or a combination of both. Deformations causing variations from a true circular cross section impair the efficiency of the pipe and weaken the structure. If conditions of maximum safety and operating efficiency are to be maintained, it is necessary to check the condition of the pipe or tubing from time to time and replace defective sections. It is impractical to periodically remove and subject the tubing to shop tests to determine these weaknesses. Devices for indicating the internal conditions of pipes or tubing known as calipering and recording devices have been designed for passage through the tubing while it is in place and in operation. These devices usually include a plurality of small wheels or feelers urged into contact with the interior surface of the tubing and connected to a recording device in a manner to scribe the normal internal surface conditions of the tubing and variations from the normal internal surface configuration of the tubing on a chart. The calipering and recording devices of this type have been particularly useful in oil well fields since they may be readily lowered into a well tubing or passed through a pipe line to indicate and record the internal conditions of the pipe or tubing. The present invention relates generally to this type of calipering and recording device.

It is a principal object of this invention to provide an improved calipering and recording device which is arranged to rotate while passing through tubing being examined causing a feeler arm to effect a spiral contact path on the inner wall of the tubing and to transmit the internal variations of the traced path to a recording chart contained within the device, thereby indicating the condition of the pipe.

It is a further object of this invention to provide a calipering and recording device capable of indicating deviations from true circular cross-section in pipes or well tubes as well as variations of the internal surface caused by erosion and other operating conditions.

It is also an object of this invention to provide an improved calipering and recording device for determining the internal surface and diameter variations of a pipe or well tube and recording of the deviations from the normal on a chart.

Further objects and advantages of this invention will be apparent by referring to the following specification and drawing in which, Figure 1 is a longitudinal section of the calipering and recording device of this invention.

Figure 2 is an end elevation taken on the line 2—2 of Figure 1.

Figure 3 is a cross-section on the line 3—3 of Figure 1.

Referring to the drawings, the mechanism is enclosed in a tubular supporting framework or housing 10 of a diameter somewhat less than the internal diameter of the pipe to be examined. One end of the housing is closed by the end wall 11 to which is preferably fastened a threaded connection 12 for the reception of a line for lowering the housing into the well tubing or for the reception of other means for advancing the housing through a pipe. The other end of the supporting framework or housing 10 is provided with an opening 13 through which is extended the feeler arm assembly.

The tubular housing 10 encloses a body member 14. One end of the body member 14 provides a block portion generally indicated at 15 which receives a sleeve member 16 as indicated. The other end of the body member 14 is tubular to provide a chamber C for a recording stylus 17, recording strip 18 and associated mechanism for effecting the record on the recording strip 18. It should be noted that the body member 14 is rotatably mounted within the housing 10 by means of bearing surfaces shown diagrammatically at 19—19. Fastened to the center of end wall 21 of body member 14 is a sleeve 22 enclosing a shaft 23. The sleeve 22 terminates in a worm 24 and is rotatable therewith about shaft 23 and in turn causes rotation of body member 14. The shaft 23 is rigidly secured in end wall 11 as shown at 25.

The body member 14 is driven by a friction drive wheel 26 which projects through an opening 27 in the housing 10 and is supported on and keyed to the shaft 28, on which is also keyed the gear 29 arranged to mesh with the worm 24. In order to provide sufficient frictional contact between the drive wheel 26 and the pipe wall, an idler wheel 30 is adapted to extend through a second opening in the housing 10 diametrically opposite to the opening 27. The idler wheel 30 is supported on a pivotal arm 31 which normally positions the wheel 30 outwardly of the housing 10 in response to the pressure of the leaf spring 32.

Guiding and centering springs 33 are fixed at radial points about the exterior of the housing 10 near the feeler end of the device to properly center the device as it passes through the tubing. In passing through tubing the friction drive wheel 26 in contact with the inner wall of the tubing will be rotated causing actuation of gear 29 and worm 24 and since the worm 24 is fixed to the body member 14 through sleeve 22, the body member 14 will be rotated within the housing 10 as the housing is moved through the tubing being examined.

As previously described, the feeler end of the body member 14 carries a sleeve 16 which is rotated therewith. An end of the sleeve projects through the opening 13 of the housing 10 and an arm 34 is secured thereto which extends radially beyond the housing, and to the arm 34 is pivotally secured a feeler lever 35 (Figure 2) having a rotatable feeler wheel 36 secured at its free end. The feeler wheel 36 is arranged to contact in sensing relation the internal surfaces of the tubing being examined. It is not essential that a rotatable feeler wheel be provided, although it is desirable to avoid excessive frictional contact with the tubing wall. A link 37 connects the feeler lever 35 with one end of a cross arm 38, whose other end is secured to a shaft 39 mounted for rotation within sleeve 16. Arm 38 and link 37 provide a bell crank arrangement so that as the feeler wheel 36 contacts a depression in the tubing wall, the shaft 39 is actuated. A tension coil spring 40 connecting the arm 38 and the radial arm 34 normally urges the feeler wheel 36 outwardly in engagement with the internal surfaces of the tubing being examined. When the shaft 39 is actuated in accordance with depressions or variations from normal surface conditions of the tubing, the stylus 17 connected to the shaft 39 will in turn be activated.

From the foregoing description it will be understood that, as the housing 10 is moved through the tubing, the body member 14, actuated by the drive wheel 26, gear 29 and worm 24, will be rotated. The radial arm 34 will rotate with the body member 14 in a plane transverse to the axis of the tubing and thus the feeler wheel 36 is caused to describe a spiral path on the tubing inner wall as the housing 10 is advanced through the tubing being examined. Hence, any variations of internal surface configuration from true circular cross-section will cause an inward or outward radial movement of the feeler wheel 36, which actuates the stylus shaft 39 and moves the stylus 17 relative to the surface of the recording strip 18.

Suitable driving mechanism for the recording strip is provided to be operated by the friction drive wheel 26. This includes a gear wheel 41 which may be called a sun gear and is fixed to the free end of shaft 23 and arranged to mesh with planet gear 42 carried by the shaft 43 extending longitudinally of chamber C and suitably journaled in the chamber end walls. It will be seen then that when the body member 14 rotates relative to the housing 10, the planet gear 42 will be caused to walk around the fixed sun gear 41 and cause the shaft 43 to rotate. The shaft 43 is provided with a worm 45 arranged to mesh with gear 46 (Figure 3) on sprocket wheel 47 which receives record strip 18 from a supply spool 48 and advances it to the take-up spool 49. The driving connection between sprocket 47 and take-up spool 49 may, for example, take the form of a spring belt 50.

The record strip 18 may be of any suitable material, such as metal strip, photographic paper, etc., although ordinary paper may be preferred. The record strip may be provided with a center line 51, as shown in Figure 3, which is located to conform to a position of the stylus corresponding to the normal configuration and diameter of the tubing being examined. Variations of internal surface configuration or internal diameter of the tubing from the normal condition are indicated on the strip 18 by variations from the normal line 51, which variations will be effected by movement of stylus 17.

While the invention has been particularly described with respect to a form adapted for calipering oil well tubing, it should be understood that the device finds utility in determining conditions of the internal surfaces of varying lengths of pipes or conduits. The record strip, when the device is used in tubing containing fluid, will be of a type impervious to harm by the fluids. And it will also be understood that various forms of driving mechanisms may be used to obtain the spiral progression of the feeler arm through the tubing.

Having described my invention, what I claim and desire to protect by Letters Patent is:

1. A pipe calipering device comprising a supporting framework adapted to be moved through a pipe to be calipered, a body member rotatably supported within said framework, means to rotate said body member as the supporting framework is moved through the pipe, said rotating means including a friction drive wheel geared to the body member and adapted to contact the pipe wall and be rotatably driven as the framework moves through the pipe, a feeler arm having one end pivotally mounted on said body member and adapted to be rotated with said body member in a plane transverse to the axis of the pipe to be calipered, resilient means urging the other end of said feeler arm outwardly in contact with the inner wall of the pipe, and means responsive to the pivotal movement of said feeler arm to record variations of internal configuration of the pipe wall.

2. Apparatus for calipering tubular members comprising a tubular casing having an opening in its lower end, a support rotatably mounted within said casing, said support including a lower bearing portion and an upper housing portion, a sleeve extending axially of the support and below said aperture in the casing, a stylus shaft rotatable within said sleeve and bearing portion and having a stylus at its upper end, a transverse arm having one end fixed to the lower end of said sleeve and its other end pivotally receiving a feeler lever, and a bell crank arrangement secured between said shaft and said feeler lever.

3. Apparatus for calipering tubular members comprising a tubular casing having an opening in its lower end, a support rotatably mounted within said casing, driving means for rotating the support as the casing is moved through the tubular member, said support including a lower bearing portion having a sleeve extending axially of the support and below said opening in the casing and an upper housing portion for receiving a recording chart, a stylus shaft rotatable within said sleeve and bearing portion and having a stylus at its upper end, a transverse arm having one end fixed to the lower end of said sleeve and its other end pivotally receiving a feeler lever, and a bell crank arrangement secured between said shaft and said feeler lever to effect movement of said stylus shaft as the feeler lever encounters pits or depressions in the inner wall of the tubular members.

4. Apparatus for calipering tubular members comprising a tubular casing having an opening in its lower end, a support rotatably mounted within said casing, said support including a lower bearing portion and an upper housing portion, a sleeve extending axially of the support and below said aperture in the casing, a stylus shaft rotatable within said sleeve and bearing portion and having a stylus at its upper end, a transverse arm having one end fixed to the lower end of said sleeve and its other end pivotally receiving a feeler lever, and a bell crank arrangement secured between said shaft and said feeler lever to effect movement of said shaft, means for rotating said support as the casing is moved through the tubular member being calipered to provide a helical course for said feeler lever and effect movement of said stylus shaft.

WILLIAM E. BARNES.

REFERENCES CITED

The following references are of record in the file of this patent:

UNITED STATES PATENTS

| Number | Name | Date |
|---|---|---|
| 2,074,753 | McClain | Mar. 23, 1937 |
| 2,102,080 | Kinley | Dec. 14, 1937 |
| 2,239,811 | Cuppers | Apr. 29, 1941 |

FOREIGN PATENTS

| Number | Country | Date |
|---|---|---|
| 512,091 | Great Britain | Aug. 29, 1939 |

OTHER REFERENCES

Oil and Gas Journal, pp. 46, 47, Jan. 6, 1945.